US011188719B1

United States Patent
Anand et al.

(10) Patent No.: US 11,188,719 B1
(45) Date of Patent: Nov. 30, 2021

(54) PREDICTIVE TEXT SYSTEM

(71) Applicant: Wells Fargo Bank, N.A., San Francisco, CA (US)

(72) Inventors: Ganesan Anand, Fremont, CA (US); Bipin M. Sahni, Pleasanton, CA (US); Madhu V. Vempati, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 96 days.

(21) Appl. No.: 16/408,397

(22) Filed: May 9, 2019

Related U.S. Application Data

(60) Provisional application No. 62/748,704, filed on Oct. 22, 2018.

(51) Int. Cl.
  *G06F 40/56* (2020.01)
  *G06F 16/332* (2019.01)
  *G06N 3/04* (2006.01)
  *G06N 3/08* (2006.01)
  *G06F 16/335* (2019.01)

(52) U.S. Cl.
  CPC ............ *G06F 40/56* (2020.01); *G06F 16/335* (2019.01); *G06F 16/3329* (2019.01); *G06N 3/04* (2013.01); *G06N 3/08* (2013.01)

(58) Field of Classification Search
  CPC .... G06F 40/56; G06F 16/3329; G06F 16/335; G06N 3/04; G06N 3/08
  See application file for complete search history.

(56) References Cited

U.S. PATENT DOCUMENTS

| | | | |
|---|---|---|---|
| 10,049,420 B1 | 8/2018 | Lee et al. | |
| 10,140,368 B2 | 11/2018 | Tang et al. | |
| 10,674,001 B1 | 6/2020 | Rao et al. | |
| 2004/0133514 A1 | 7/2004 | Zielke et al. | |
| 2008/0263363 A1 | 10/2008 | Jueneman et al. | |
| 2014/0189808 A1 | 7/2014 | Mahaffey et al. | |
| 2015/0363582 A1 | 12/2015 | Sheller et al. | |
| 2016/0246805 A1* | 8/2016 | Long | G06F 16/90324 |
| 2017/0116606 A1 | 4/2017 | Haulotte et al. | |
| 2017/0357890 A1* | 12/2017 | Kim | G06F 40/30 |
| 2018/0096302 A1* | 4/2018 | Tseretopoulos | H04L 67/02 |

(Continued)

OTHER PUBLICATIONS

"U.S. Appl. No. 16/227,628, Advisory Action dated Jan. 28, 2021".

(Continued)

*Primary Examiner* — Kevin Ky
(74) *Attorney, Agent, or Firm* — Schwegman Lundberg & Woessner, P.A.

(57) ABSTRACT

A method may include presenting a user interface on a computing device, the user interface including a character input portion and a predictive suggestion portion; converting, using at least one processor, a set of characters entered in the character input portion into a word vector; inputting the word vector into a neural network; based on the inputting, determining a set of output terms from the neural network; querying a data store to retrieve a user specific data value for an output term of the set of output terms; and presenting a paired output term that includes the output term and the user specific data value in the predictive suggestion portion of the user interface.

18 Claims, 8 Drawing Sheets

(56) References Cited

U.S. PATENT DOCUMENTS

| | | | |
|---|---|---|---|
| 2018/0174043 A1* | 6/2018 | Po | G16H 50/20 |
| 2019/0332694 A1 | 10/2019 | Tcherechansky et al. | |
| 2019/0354252 A1 | 11/2019 | Badr | |
| 2020/0058298 A1* | 2/2020 | Ban | G10L 15/197 |

OTHER PUBLICATIONS

"U.S. Appl. No. 16/227,628, Final Office Action dated Nov. 16, 2020".
"U.S. Appl. No. 16/227,628, Non Final Office Action dated Jul. 28, 2020", 40 pgs.
"U.S. Appl. No. 16/227,628, Response filed Jan. 13, 2021 to Final Office Action dated Nov. 16, 2020".
"U.S. Appl. No. 16/227,628, Response filed Feb. 11, 2021 to Advisory Action dated Jan. 28, 2021", 12 pgs.
"U.S. Appl. No. 16/227,628, Response filed Oct. 28, 2020 to Non Final Office Action dated Jul. 28, 2020".
"U.S. Appl. No. 16/408,399, Non Final Office Action dated Oct. 15, 2020".
"U.S. Appl. No. 16/408,399, Response filed Jan. 13, 2021 to Non Final Office Action dated Oct. 15, 2020", 8 pgs.
"U.S. Appl. No. 16/227,628, Non Final Office Action dated May 4, 2021".
"U.S. Appl. No. 16/408,399, Final Office Action dated Apr. 20, 2021".
"U.S. Appl. No. 16/408,399, Response filed Jun. 21, 2021 to Final Office Action dated Apr. 20, 2021".

* cited by examiner

PREDICTIVE TEXT SYSTEM

CROSS-REFERENCE TO RELATED PATENT DOCUMENTS

This patent application claims the benefit of priority, under 35 U.S.C. § 119(e), to U.S. Provisional Patent Application Ser. No. 62/748,704, titled "PREDICTIVE TEXT SYSTEM," filed on Oct. 22, 2018, which is incorporated by reference in its entirety.

BACKGROUND

There are many types of character input devices used with computing devices. For example, a physical keyboard is often the main input device for a laptop computer or desktop computer. As smaller mobile devices become more prevalent, physical keyboard were often removed in favor of overloading numerical keys already present on phones. For example, the '2' key may be used for 'a', 'b', or 'c.' A person may hit the '2' key once for 'a', twice for 'b', and three times for 'c.' In many instances, touch interfaces with on-screen keyboards replaced physical keyboards and keypads.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
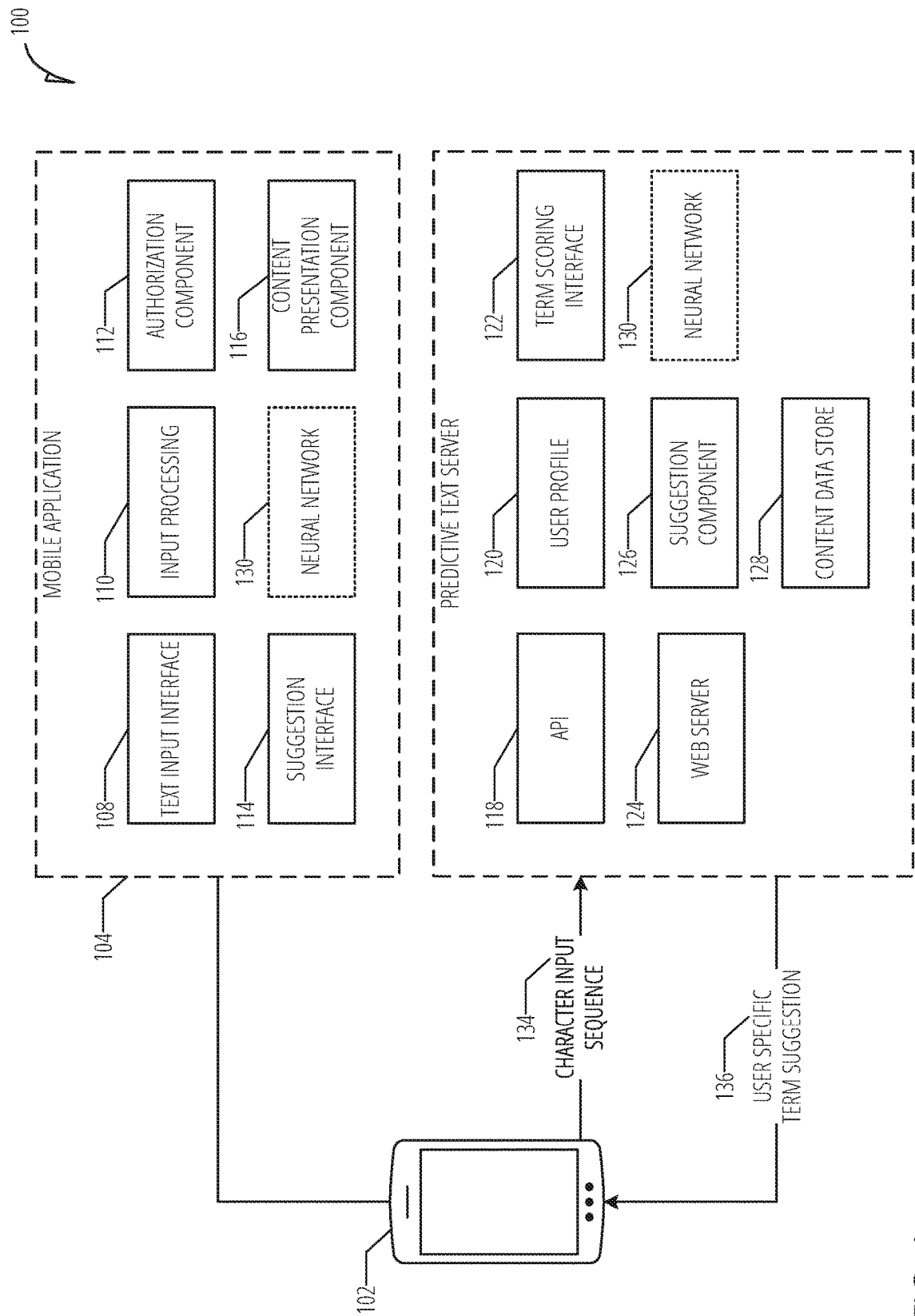
FIG. 1 is a component diagram of a mobile application and a predictive text server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

One of the problems when using keyboard entry methods on mobile devices with small display devices, like cellular phones, is the error rate when entering words. Additionally, the speed of text entry using mobile devices is often much lower than traditional, full-sized, physical keyboards.

Predictive text systems were introduced to help alleviate some of these challenges. For example, a user may enter 'Ap' and a completion suggestion for "April" may appear in a box above an on-screen keyboard. Because of the limited screen space available on mobile devices, only a few suggestions may be presented (e.g., three or fewer). Accordingly, the presented suggestions are often based on a combination of word stemming and frequency of use. A dictionary may be stored that indicates the relative frequency of a word. In some instances, user-specific terms (e.g., email-addresses, street names, etc.) may be added to the dictionary if they are used more than a threshold amount of times.

Predictive text systems may take into consideration the previous word entered in presenting suggestions. For example, if a user types "I'll" suggestions may appear—before the user even enters in another character—such as "be" or "do" or "have." The suggestions may be refined as a user type. Thus, if a user types 'd' the suggestions may be updated to "do" and "definitively."

Current predictive text systems are inadequate for specialized contexts or technical fields. For example, consider that a user is conversing via a messaging interface with a customer service agent of a bank. If the user types "Ap" the suggestions would not give an option for "APR" because "APR" is not frequently used in regular speech patterns compared to "app" or "apple". A more intelligent predictive text system, as describe herein, considers the context of the chat, such that "APR" may be presented. As another example consider that a user may types "chec." Current systems may suggest "checking," but the next suggested set of words may be "in", "out", and "to," not "balance" as is likely intended given a financial context.

In view of the above problems and limitations of existing predictive text systems, an improved predictive text mechanism may be used. The predictive text system may be used within a financial application installed on a user's mobile device, such as a cellular phone in various examples. The predictive text system may use a trained machine learning model, such as a neural network, to suggest words or phrases (herein referred as terms) based on characters input into a keyboard. Although discussed in a financial context, the described solution is not limited to such uses. For example, other specialized or context specific domains (e.g., medical) may train their own neural networks to suggest terms to a user.

In some examples, the described techniques may be used to suggest chatbots to a user as part of a predictive keyboard suggestion. The training data may be intents of users with respect to various tasks (e.g., checking balance, fraud, getting current interest rates, etc.) and if the intent of the user matches a chatbot that can help the user (as defined by a dataset), a chatbot may be presented as a suggestion. Thus, if a user types "help with fraud" a suggestion may include "chatbot" because the training data indicates that the chatbot is capable of helping answer questions about fraud.

The neural network may be trained using a subject matter specific text corpus. The limited corpus may include financial texts, relationship information of a user with an entity, line of business user experience optimized content, and suggested phrases. More detailed descriptions of the training corpus are described below. By using a subject matter specific corpus, the neural network may be trained to suggest terms in a specialized context as opposed to common usage terms—as done by existing predictive text systems.

In addition to the neural network, a scoring function (e.g., weighted values) may be used to re-rank some of the suggested terms from the neural network. In various examples, the suggested terms may be paired with user-specific information and presented to the user for selection. For example, if the user has a mortgage account with a financial institution, and types "mort" a suggested term may be "mortgage balance: $234,124."

The described predictive text system provides many benefits over existing predictive text systems. First, it provides a subject-matter specific predictive library of words by using a neural network. Second, the suggest terms may incorporate data stored in remote servers outside of the predictive text system such as user profile or relationship information with an entity. Third, the suggested terms may include sensitive data (e.g., account balances) that are not stored on the cellular device. Other benefits may be apparent to one skilled in the art.

Given the limited screen space, the described predictive text system may provide an improved input method and user interface to users. Additionally, security benefits may be realized by using the authentication status with a third-party before presenting sensitive information.

FIG. 1 is a component diagram 100 of a mobile application and a predictive text server, according to various examples. Diagram 100 illustrates mobile device 102, mobile application 104, and predictive text system 106. Mobile application 104 may include text input interface 108, input processing 110, authorization component 112, suggestion interface 114, neural network 130, and content presentation component 116. Predictive text system 106 may include Application Programming Interface (API) 118, user profiles 120, term scoring interface 122, web server 124, suggestion component 126, content data store 128, neural network 130. Diagram 100 further shows character input sequence 134 being transmitted to predictive text system 106 and user specific term suggestion 136 being transmitted to mobile device 102. Although discussed in the content of mobile devices without a physical keyboard, the described operations of predictive text (e.g., FIG. 6) and authentication (e.g., FIG. 7) may also be used on other user devices (e.g., a desktop device) with physical keyboards.

For illustration purposes, mobile application 104 and predictive text system 106 are illustrated as respective sets of separate functional units (e.g., text input interface 108, input processing 110, term scoring interface 122, etc.). The functionality of multiple units may be performed by a single unit. In various examples, the features described for the functional units of mobile application 104 may be performed at predictive text system 106, as well as the reverse.

A functional unit may represent computer program code that is executable by a processing unit (e.g., a core of a general-purpose computer processor, a graphical processing unit, an application specific integrated circuit, etc.). The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Mobile device 102 may be a device without a separate physical keyboard entry method such as a phone or tablet with a touch screen. Predictive text system 106 may be used with other client devices in various examples. Client devices may include, but are not limited to, a smartphone, tablet, laptop, multi-processor system, microprocessor-based or programmable consumer electronics, game console, set-top box, or other devices that a user utilizes to communicate over a network. In example embodiments, mobile device 102 may comprise a display module (not shown) to display information (e.g., in the form of specially configured user interfaces). In some embodiments, mobile device 102 may include one or more of a touch screen, camera, keyboard, microphone, and Global Positioning System (GPS) device.

In various examples, mobile device 102 and predictive text system 106 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

Mobile application 104 (also referred to a predictive keyboard) may be installed on mobile device 102 in variety of ways. Mobile application 104 may be used for text processing as part of a larger application. For example, a financial institution may offer one or more applications (e.g., a banking application, a business management application) that have input elements. When using the input elements, mobile application 104 may process the input and provide suggestions as the user types. The user may authenticate to the larger application before some of the suggestions are presented. For example, to have a suggestion with an account balance, the user may need to use a biometric sensor on mobile device 102 to confirm the user's identity.

Mobile application 104 may be used to process input in a chat application. The chat application may be associated with the same organization/enterprise as mobile application 104 or be a third-party application (e.g., Messenger by the FACEBOOK® social network). If a third-party application is used, mobile application 104 may restrict some of the suggestions regardless of the authentication status of the user. Restrictions may include preventing suggestions with account numbers or balances. Accordingly, in some instances, the predictive keyboard may function as financial specific predictive keyboard in contrast with a financial specific predictive keyboard customized to a user.

In various examples, mobile application 104 may be a replacement keyboard installed on mobile application 104 downloaded from an online store (e.g., the APPLE APP STORE® or the GOOGLE PLAY™ STORE). A user may select mobile device 102 for use as the input mechanism for text entry using preferences provided by the operating system of mobile device 102. As with third-party applications, suggestions may be restricted when using mobile application 104 as a replacement keyboard outside of an application associated with the organization providing the keyboard.

A predictive keyboard may also be used as part of a web application. A web application may provide user interface (UI) components that are rendered on a display device of a computing device using a web browser. The user may interact (e.g., select, move, enter text into) with the UI components, and, based on the interaction, the web application may update one or more portions of the web page. A web application may be executed in whole, or in part, locally on a client device. The web application may use the functional units illustrated in mobile application 104 or predictive text system 106 to suggest terms to a user.

A web browser on mobile device 102 and web application hosted by web server 124 be may communicate via API 118. An API provides a method for computing processes to exchange data. A web-based API may permit communications between two or more computing devices such as a client and a server. API 118 may define a set of HTTP calls according to Representational State Transfer (RESTful) practices. A RESTful API may define various GET, PUT, POST, DELETE methods to create, replace, update, and delete data stored on in a database on the server. For example, "GET /balance/userid" may be used to retrieve balance information for the identification indicated by "userid." The balance may be used as part of a suggested paired term presented to a user. API 118 may transmit responses to requests for data according to the JavaScript Object Notation (JSON) format.

APIs may also be defined in frameworks provided by an operating system (OS) manufacturer to access data an application may not regularly be permitted to access. For example, an OS of mobile device 102 may define an authentication API call. Accordingly, an application provider may use the API call to request a user be authenticated using a biometric sensor on the mobile device. By segregating any underlying biometric data—e.g., by using a secure element—the risk of unauthorized transmission of the biometric data may be lowered while still providing the application with the knowledge that the user is authentic. The authentication of user with respect to mobile device 102 may be used to retrieve stored credentials for the mobile application 104. This information may then be passed to an external server (e.g., a financial institution) for authentication with the external server. Only after the external service authenticates the user with their credentials may the user be considered authenticated with respect to mobile application 104 in various examples.

Text input interface 108 may be rendered as a text input box on a display of mobile device 102. As the user enters characters into text input interface 108, input processing 110 may convert the characters into a vector representation (discussed in more detail in FIG. 2) for feeding into a trained neural network such as neural network 130. The output of neural network 130 may, for a given vocabulary of terms, determine the likelihood—expressed as a probability or cosine distance—the user will type a term given the input vector. When neural network 130 is part of mobile application 104, it may be updated periodically by a copy of neural network 130 located at predictive text system 106.

Suggestion interface 114 may present the set of terms with the highest likelihood. The number of terms presented may be limited given the physical constraints of the display device of mobile device 102. For example, when the display is only two inches across, three suggestions may be presented. Suggestion interface 114 may be displayed in a variety of places on a user interface on the display device. In some examples, the suggestions are presented above a keyboard interface on the display device. In some examples, the suggestions are presented as part of a drop-down menu. The suggestions may be selectable by touching the suggestion on the display device.

After a user selects one of the terms, input processing 110 may take the selected term and use it as an input into neural network 130. Based on the output neural network 130, suggestion interface 114 may be updated to present new suggestions.

Authorization component 112 may be used to authenticate the user with respect to an organization such as a financial institution. For example, authorization component 112 may present input boxes for a user name and password. In example, authorization component 112 uses an API provided by an OS of mobile device 102 to authenticate the user using biometrics (e.g., facial identification, fingerprint, etc.).

The suggested terms presented may be paired with user specific data values depending on the authentication status of the user with respect to mobile application 104 and the location of the predictive keyboard, such as a keyboard within an application provided by the same organization as the predictive keyboard or a third-party application such as a generic chat application. For example, if the most likely term is balance and the user is authenticated, an account balance may be paired with account to create a paired suggested term of "balance: $5,235." The paired term may be presented within suggestion interface 114. When the user is not authenticated, a non-paired term of "balance" may be presented.

Content presentation component 116 may be used to present content related to a selected term. For example, if text input interface 108 is part of a search query, content presentation component 116 may present content tagged with elements of the search of suggested terms of the search. The content may include documents, pictures, text, etc. The content may be retrieved from content data store 128. For example, if a user types "apply for a" and the suggested term is "mortgage" content may appear with information regarding current mortgage rates and a link to apply for a mortgage.

With respect to predictive text system 106, user profiles 120 may store information related to users. For example, consider that predictive text system 106 is provided as part of a financial institution's mobile application. A user may use the application to view account balances, transfer money, etc. In such a scenario, user profiles 120 may store account numbers, interest rates, account balances, fraud claims, etc. The information in predictive text system 106 may be used to create a paired term suggestion as described previously.

Different types of user data may be stored differently depending on a sensitivity classification and use case. For example, non-sensitive data may be cached on mobile device 102 regardless of authentication status such as neural network 130. Some data such as content data may be stored at predictive text system 106 and retrieved on demand. Sensitive data such as account numbers and balances may be stored at predictive text system 106 and may only be accessed if the user is authenticated. Any sensitive data may be deleted from mobile application 104 when the user logs out or when a user session ends.

In various examples, sensitive data is only transmitted back to mobile device 102 as a suggested paired term. For example, suggestion component 126 may receive characters input into mobile application 104. Suggestion component 126 may submit input the characters, in vector form, into neural network 130 at predictive text system 106. As discussed above, the output of neural network 130 may indicate the most likely completed or next term. If the likelihood includes a term that may be paired with sensitive user data, suggestion component 126 may retrieve the user data to create the paired term and transmit it back to mobile application 104 for presenting in suggestion interface 114.

Term scoring interface 122 may be used to create additional training data for neural network 130 as well as increasing/decreasing weights for an output term given an input value. The most knowledgeable person be a specialized field or line of business may be a person that works within that line of business. Term scoring interface 122 is discussed in more detailed in the context of FIG. 2.

Figure 2:
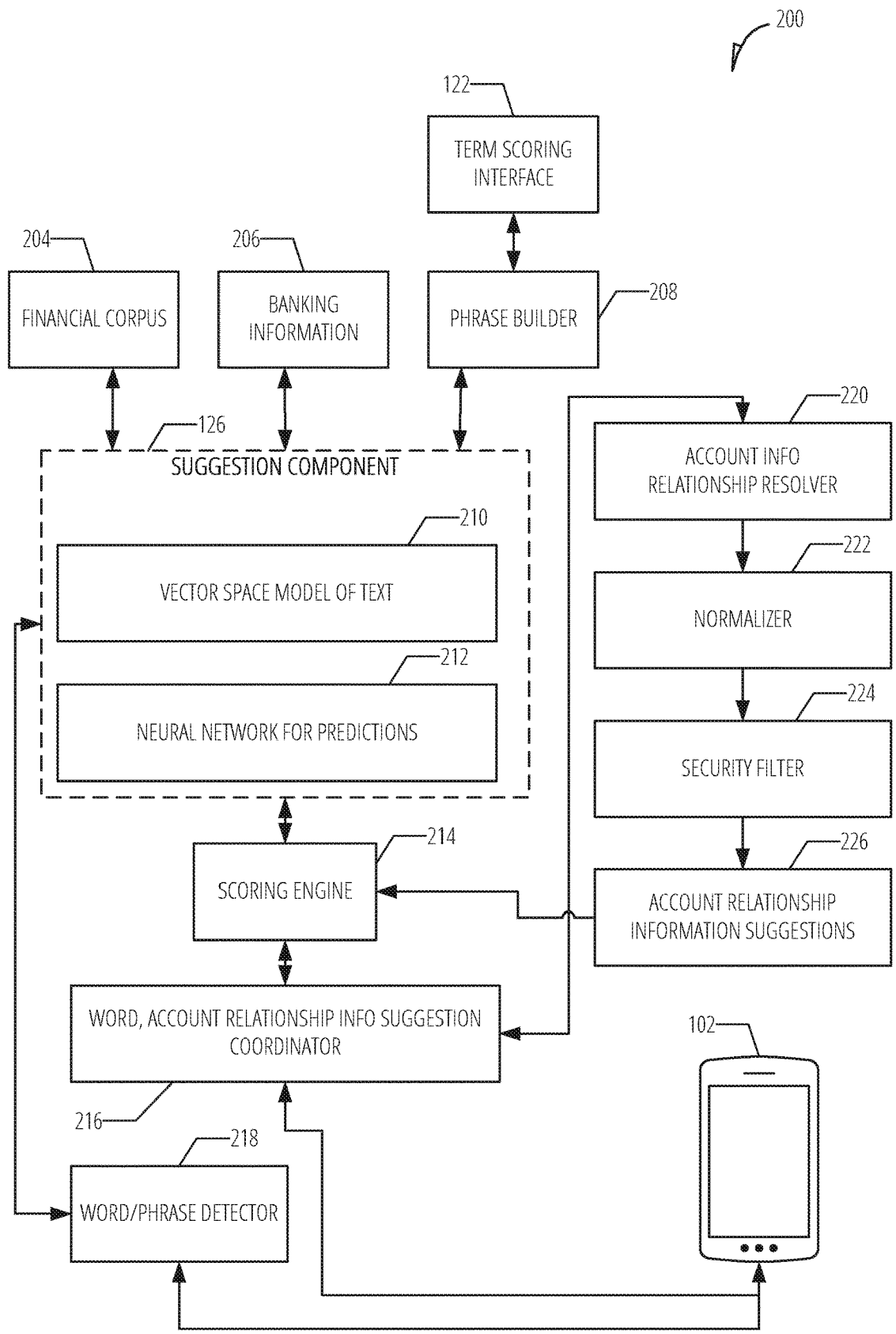
FIG. 2 is a diagrammatic representation of training and using a suggestion component, according to various examples.

FIG. 2 is a diagrammatic representation of training and using suggestion component 126, according to various examples. FIG. 2 illustrates suggestion component 126 with vector space model of text 210, neural network for predictions 212, and scoring engine 214. Inputs are illustrated as financial corpus 204, banking information 206, and phrase builder 208. Term scoring interface 122 may be used to create training phrases for phrase builder 208. Word/phrase suggestion coordinator 216 and word/phrase detector 218 may be used in conjunction with suggestion component 126 to generate suggestions for presenting on mobile device 102. In various examples, neural network for predictions 212 is a neural network such as neural network 130. Suggestion coordinator 216 may also use account information relationship resolver 220, normalizer 222, security filter 224 to obtain the account information suggestions 226 in various examples Different machine learning models are used depending on the type of training data available. For example, supervised learning may be used with labeled data sets that include an input and output. Unsupervised learning may use non-labeled data sets. A subset of machine learning uses word embeddings to train a machine learning model. A word embedding is a vector representation of word or phrase that may be compared to another word to determining their similarity. Different machine learning models use and generate word embeddings in different ways. For example, suggestion component 126 may use training data such as financial corpus 204 (e.g., articles from financial related websites, novels, news articles, references, etc.) to generate the word embeddings. In some examples, pre-trained models may be used that include a set of word embeddings for use as a starting point.

Training of neural network for predictions 212 in suggestion component 126 may be implemented in a variety of ways, including but not limited to, Word2Vec, GloVe, fastText, and conceptnumberbatch. In some examples, neural network for predictions 212 is a shallow neural network with a single hidden layer (e.g., Word2Vec) or a distributional semantic model (e.g., GloVe). Word2vec supports two prediction types of embeddings: Continuous Bag of Words (CBOW) and Skip Gram. CBOW uses the context to predict the words whereas Skip Gram uses the opposite model of CBOW where context is predicted using a sequence of characters or words. Other neural network architecture may also be used such as recurrent neural networks using long short-term memory units that consider an order of words. Regardless of the precise model used, the result of training the model may be a set of word embeddings for words in the training data.

Word2vec is an example technique that generates word embeddings (e.g., vector representations) of a vocabulary of words. The number of features for each word embedding (e.g., how many dimensions in the vector) may be configurable. This technique first forms a "one-hot" or 1-of-N encoding from a vocabulary of words (e.g., vector space model of text 210), which may be based on financial corpus 204. So, if the vocabulary includes [king, queen, man, women], king may be encoded in a vector of [1, 0, 0, 0], queen as [0, 1, 0, 0] and so forth. Each vector may only have a single '1' and the rest '0's. Once each word has a vector representation, mathematical calculations may be made such as v(King)−v(Man)+v(Woman) may approximately equal v(Queen). Furthermore, the word embeddings may be used to find semantically similar words.

Neural network for predictions 212 may be used to generate a word embedding, of N features, for each of the words in the vocabulary. Neural network for predictions 212 may include a single fully connected hidden layer with NxV nodes. The output layer may be the same size as the input layer—four nodes continuing the example above. A matrix of size V×N may connect the input layer to the hidden layer and a matrix NxV connections may connect the nodes of the hidden layer to the output layer. The SoftMax function may be used to translate the output layer into a series of probabilities that add up to one based on the corpus of text and given vocabulary.

The neural network may be trained by using word (or phrase) pairs (context, target) from corpus of training data. The neural network may have a window parameter that indicates how far from a "center word" pairs should be generated. The words in the window may be considered contextual terms for the center word. Consider the phrase "Your checking account balance is $15,345" with a two-word window. The underlined term may be the center word. Pairs may be created by selecting each word in the sentence and going forward or backward (respecting stops like periods) according to the window. So, when "account" is the center word, word pairs of [account, checking]; [account, your]; [account, balance]; and [account, is] may be created.

After training, the rows of the weight matrix between the input layer and the hidden layer are the word embeddings. For example, if the one-hot-encoded of "checking" was the $355^{th}$ position (e.g., [0, 0, 0, ..., 1, ...]) the word embedding would be the $355^{th}$ row of the weight matrix: 1st row [50, 23, 34, 23, ...] 2nd row [34, 34, 87, 34, ...] ... 355th row [97, 48, 27, 54, ...]. Thus, in effect, the weight matrix becomes a lookup table for the word embeddings. The similarity of two words may be determined by calculating the cosine difference between two different words in the resulting vector space. Accordingly, the closer two words are in vector space, the more likely they have appeared near each other in the training data. Therefore, the closer a first word and a second word are in vector space, the more likely a user may type the second word given the first word.

A distributional semantic model like GloVe (global vectors for word representation) may apply an unsupervised learning algorithm that generates a co-occurrence matrix. GloVe looks at how many times a target word appears in the context (e.g., a window size or sentence) of a context word. GloVe may parse corpus of training data to obtain these counts. After parsing, the training objective of GloVe yields word embeddings such that their dot product equals the logarithm of the words' probability of co-occurrence. Other latent semantic analysis methods may be also be used to derive the co-occurrence matrix.

In various examples, banking information 206 and phrases resulting from phrase builder 208 may also be used to train neural network. In some examples, banking information 206 and the phrases may be used to augment or modify the output from neural network for predictions 212. Banking information 206 is user specific. For example, the most likely term for account may be "checking," but if the user does not have a checking account according to banking information 206, "checking" may not be shown as an example or may be placed lower in a result list.

Phrase builder 208 may include phrases entered various by subject matter experts using term scoring interface 122 that may not be prevalent in financial corpus 204. The subject matter experts may also provide rules that override or modify a ranking of the suggestions of output by neural network for predictions 212. The rules may be stored as part of business rules 214 for ranking. For example, a subject matter expert may indicate that if a user types "Reset" the first suggested term may be "password" regardless of what neural network for predictions 212 indicates.

Regardless of the precise methodology used (LSA, GloVe, word2Vec, the result of the training may be a lookup table that be used to suggest terms based on characters entered by a user.

Another source of suggestions may be banking information of the user based on the account relationships with the bank. The banking information may only be available if the user is authenticated with the bank. Account information relationship resolver may use the login information of the user with the bank to retrieve the banking information. Normalizer 222 may take account balances and normalize the balances into a prescribed format (e.g., $X,XXX). Security filter 224 may be used to confirm the authenticated status of the user before the banking information is used in a suggestion. Account relationship information suggestions 226 may be passed back to scoring engine 214, which makes the ultimate decision of what suggestions to present to a user.

Word/phrase detector 218 may take the input from a user on mobile device 102 and submit it to suggestion component 126. Vector space model of text 210 may be used to take the input and convert it to a feature vector for submission to neural network for predictions 212. The most likely words based on neural network (or other training model) for predictions 212 may be modified based on scoring engine 214 used for ranking. If the user is authenticated, word/phrase suggestion coordinator 216 may take sensitive user data such as balance information and pair it with one of the suggested terms and present them to the user on mobile device 102.

In various examples, scoring engine 214 is a scoring function (e.g., a weighting function, if/then rules, etc.) that decides which suggestions to ultimately present to a user. The suggestions may be of three types: financial corpus suggestions based on neural network 212; banking information (e.g., account balance) based on the user account relationships, and mobile in-app links. The mobile in-app link suggestions may be based a similarity comparison between characters entered by the user and in-app links (e.g., BillPay).

Figure 3:
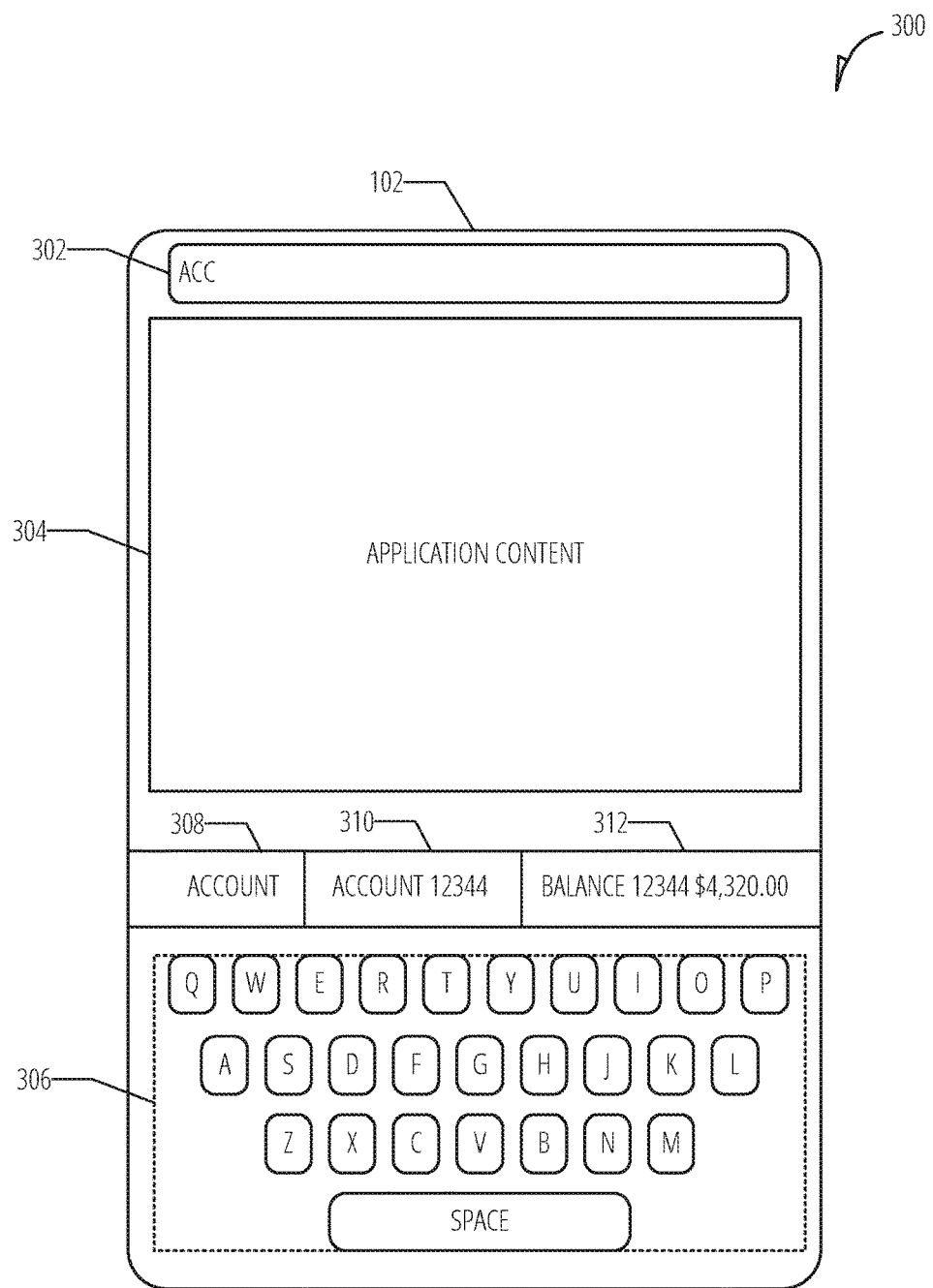
FIG. 3 is a user interface diagram on a mobile device, according to various examples.

FIG. 3 is a user interface diagram on a mobile device, according to various examples. The user interface of mobile device 102 includes input box 302, application content 304, keyboard 306, and term suggestions 308-312. In various examples, the user interface is presented on a touch screen of mobile device 102.

As illustrated, a user may have entered "Acc" into input box 302. Input box 302 may be an example of text input interface 108. Input processing 110 may use "Acc" as an input into neural network 130. In response, a set of suggestions may be generated as discussed previously. Some of the suggested may be paired suggestions such as term suggestion 310 and term suggestion 312. The paired suggestion may be a suggestion with banking information.

Figure 4:
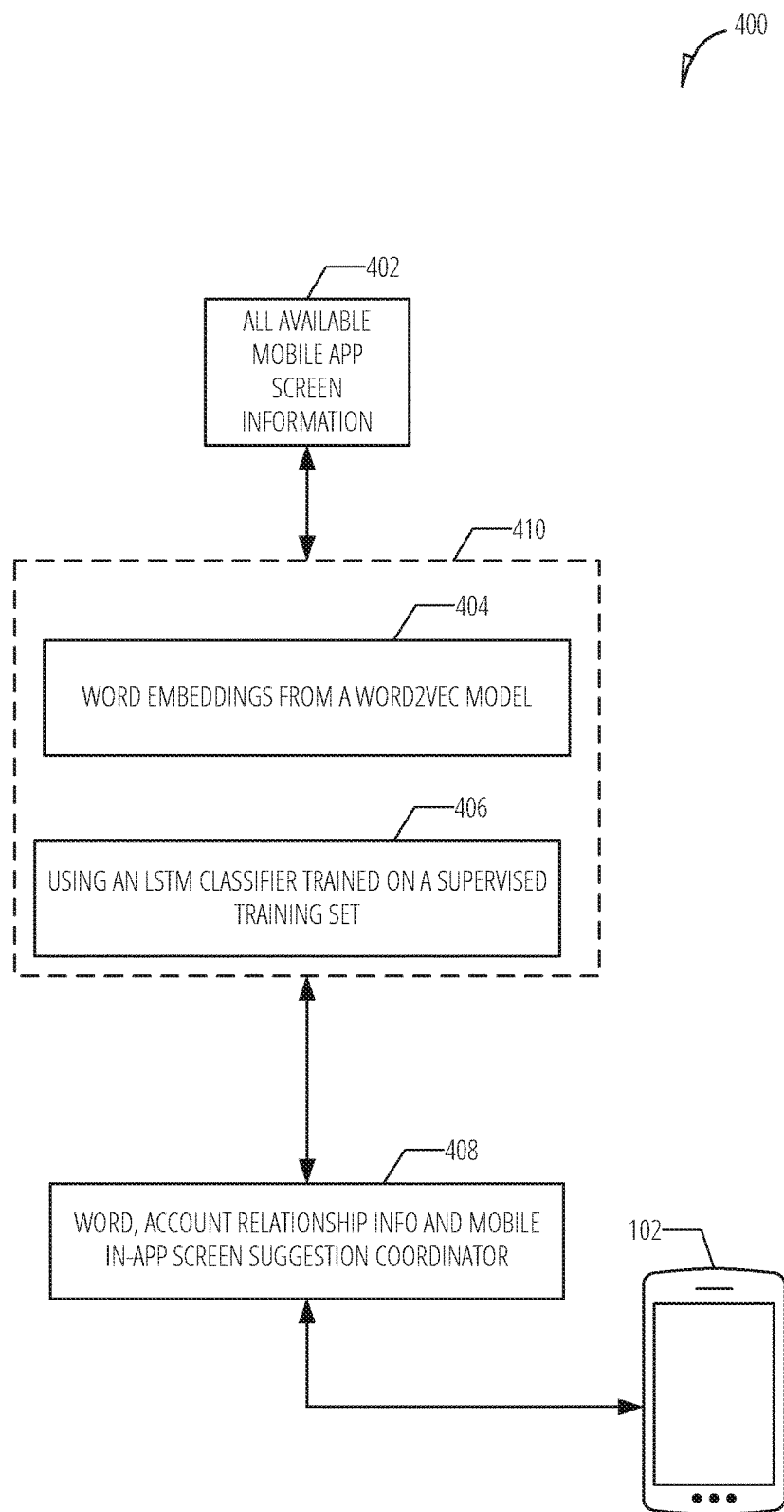
FIG. 4 is a diagrammatic representation of training and using a suggestion component, according to various examples.

FIG. 4 is a diagrammatic representation of training and using a suggestion component 410, according to various examples. Suggestion component 410 may be trained using all available mobile app screen information 402. Mobile app screen information 402 may be text or links to areas of a mobile application (e.g., mobile application 104). A set of word embeddings from a word2vec model 404 may be used with LSTM classifier 406 to generate in-app link suggestions based on characters input from a user using mobile device 102, for example. The suggestions may be presented by suggestion coordinator 408 in various examples.

Figure 5:
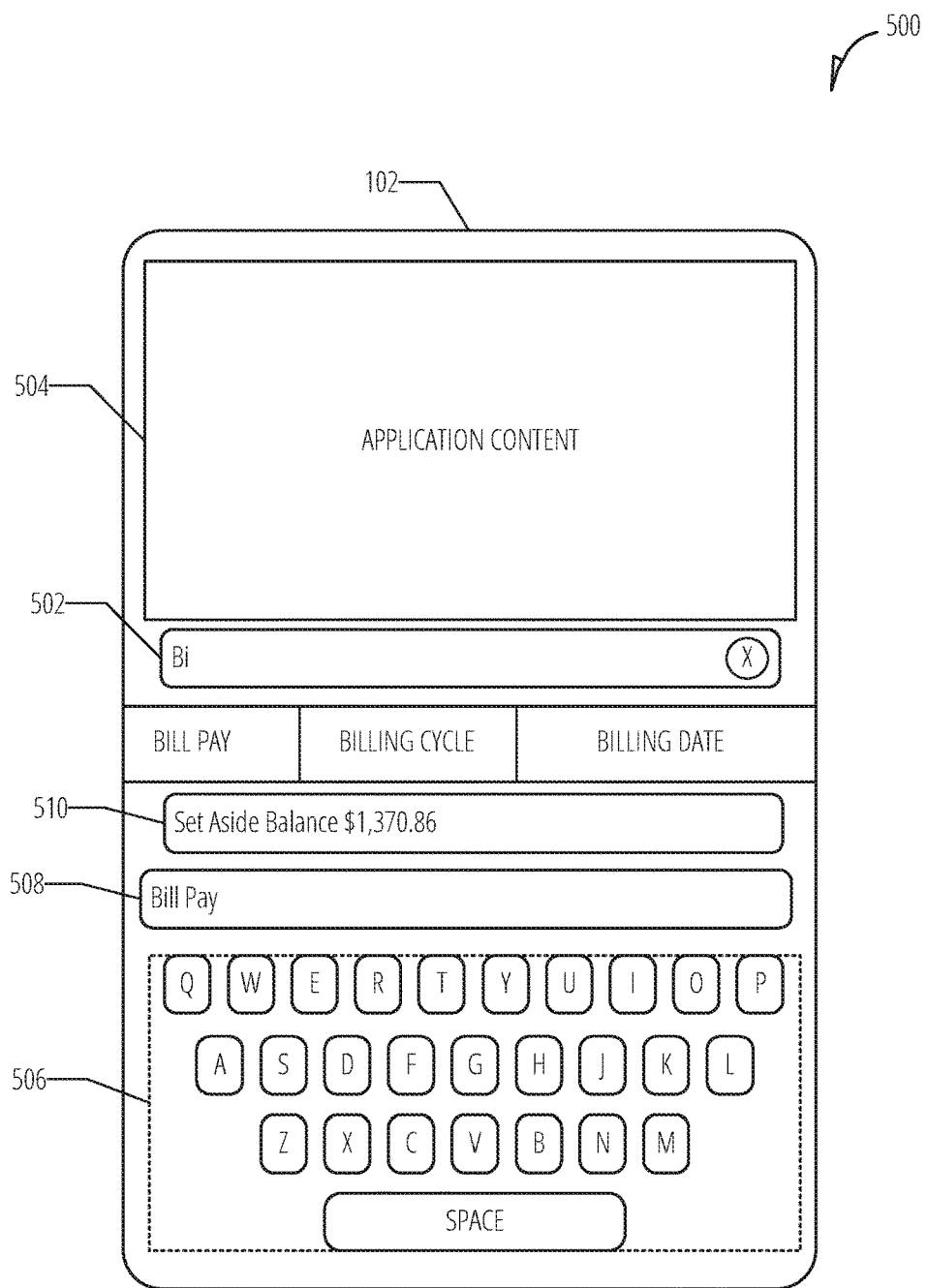
FIG. 5 is a user interface diagram on a mobile device, according to various examples.

FIG. 5 is a user interface diagram on a mobile device, according to various examples. The user interface of mobile device 102 includes input box 502, application content 504, keyboard 506, in-app link 508, and link action 510. In various examples, the user interface is presented on a touch screen of mobile device 102.

As illustrated, a user may have entered "Bi" into input box 502. Input box 502 may be an example of text input interface 108. Input processing 110 may use "Bi" as an input into neural network 130. In response, a set of suggestions may be generated as discussed previously which include "Bill Pay", "Billing Cycle" and "Billing Date". Additionally, a scoring engine (e.g., scoring engine 214) may present suggestions based on in-app links and customer information. Accordingly, in FIG. 5, in-app link 508 may be a button that takes a user to their bill pay information. More granular suggestions may also be presented such as link action 510 which sets aside money.

Figure 6:
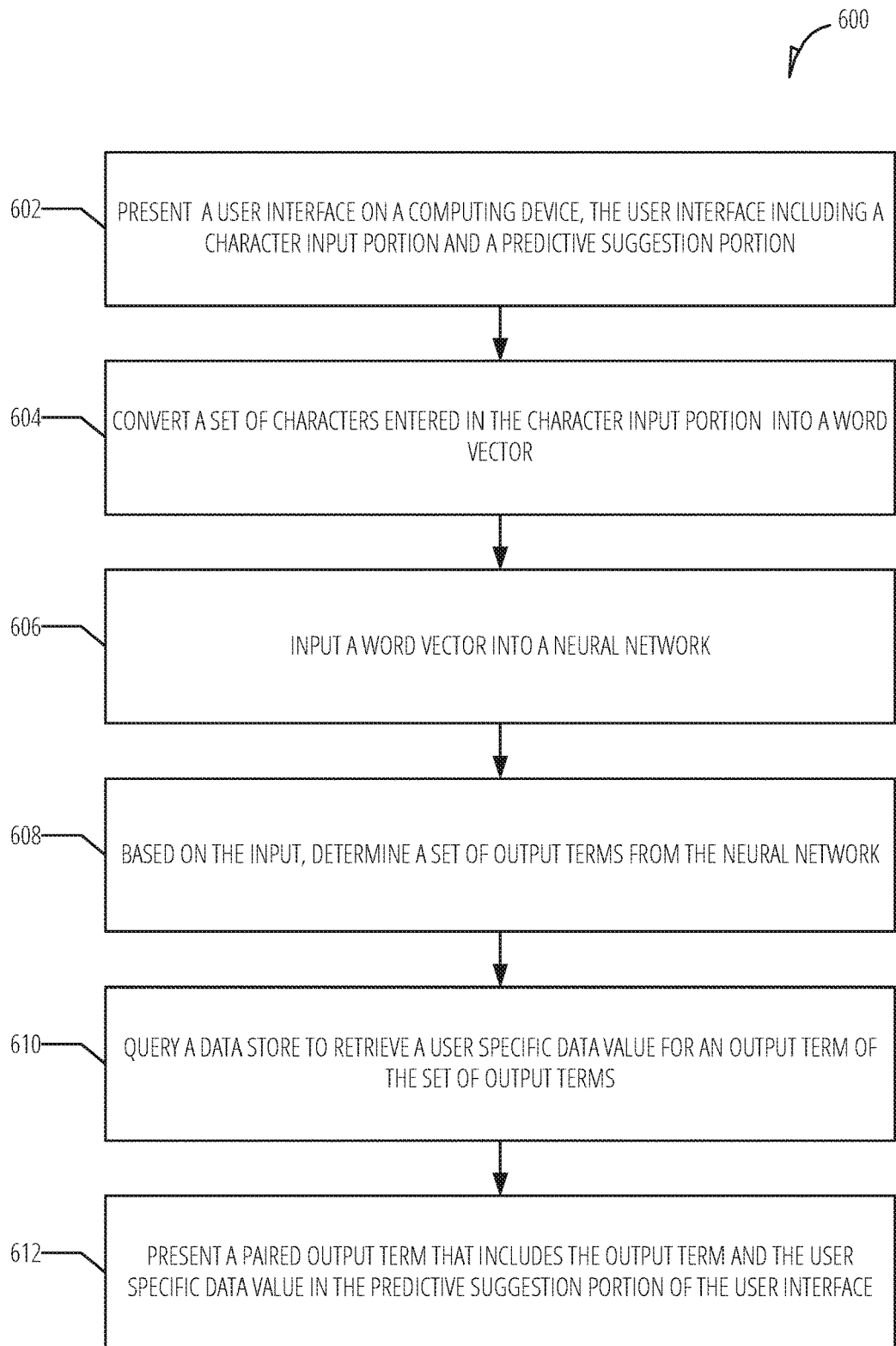
FIG. 6 is a flowchart illustrating a method to present suggested terms to a user, according to various examples.

FIG. 6 is a flowchart illustrating a method to present suggested terms to a user, according to various examples. The method is represented as a set of blocks that describe operations 602-612 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 602, in various examples, a user interface may be presented on a computing device. The user interface may include a character input portion and a predictive suggestion portion. The input portion may be presented as a search query as in input box 302 of FIG. 3. The user interface may be part of an application executing on the computing device. The predictive suggestion portion may be segmented in accordance with a number of suggested output terms. The output terms may be selected a user. When selected, the output term may be presented in the input portion of the user interface.

At operation 604, in various examples, a set of characters entered in the character input portion may be converted into a word vector. The word vector may be of a length equal the number of possible output terms in a vocabulary. Each location in the vector may correspond to a possible term. A lookup table may be used to find the appropriate location in vector for the set of input characters.

At operation 606, in various examples, the word vector may by input into a neural network. The neural network may be a feed forward neural network. An input layer of the neural network and an output layer of the neural network may be configured (e.g., the hyperparameters of the neural network) to be of a size equivalent to a number of terms in a vocabulary of subject-matter specific terms in which the set of output terms are determined. The neural network may include a single hidden layer of neurons with no activation function. In various examples, the neural network is configured using Word2Vec using CBOW. Other types of neural networks may be also be used such as recurrent neural networks.

At operation 608, according to various examples, a set of output terms may be determined from the neural network according to the input. For example, the out neural network may indicate, for each term in the vocabulary, the probability that a user would type the respective subject-matter specific term given the input characters. The number in the set may be limited to according to a physical size or pixel resolution of the computing device. For example, a mobile phone with a 6.5-inch diagonal display may be limited to the top (e.g., highest probability) three terms. The probabilities may be based on comparing a distance in vector space between the set of characters and coordinates of terms represented in the neural network as discussed previously.

At operation 610, according to various examples, a data store may be queried to retrieve a user specific data value for an output term of the set of output terms. For example, certain output terms may have a flag (e.g., in a database) indicating that a user specific value may be paired with the output term such as account with an account number or an account balance. In various examples, user specific data values are only received and paired with a term if the user is authenticated.

User specific values may also be used to remove suggested output terms from the set of output terms. For example, the method may include retrieving a set of account types—a user specific value—for the user from a user profile. An output term may be removed from the set of output terms based on the set of account types. For example, if the output term does not match one of the account types, the output term may be removed. In some examples, the user specific value (e.g., balance or account number) is associated with one of the retrieved account types.

At operation 612, in various examples, a paired output term is presented that includes the output term and the user specific data value in the predictive suggestion portion of the user interface. In various examples, a non-paired output term may be presented simultaneously in the predictive suggestion portion of the user interface.

Determining the authentication status of a user as used in operation 610 and discussed above in this disclosure (e.g., authorization component 112) may be performed using active authentication or passive authentication, in various examples. Active authentication may include requesting the user enter in their credentials each time a mobile application (e.g., the predictive keyboard or application within another messaging application) is used outside of an associated application (e.g., a banking application).

For example, consider that a user wants to text their current balance to a user within Messenger by the FACE-BOOK® social network. A keyboard may be installed/used within Messenger that presents a button to retrieve their current balance, but first a username/password may be entered to authenticate the user to the bank. This active authentication process may be repeated each time a balance is requested which may become cumbersome with the limited screen size on a mobile device. The keyboard may still be used without authenticating, but only in a generalized/limited context as described previously.

In various examples, the mobile application itself may be used to passively authenticate the user to the bank without requiring entering in a username/password each time information is requested.

Figure 7:
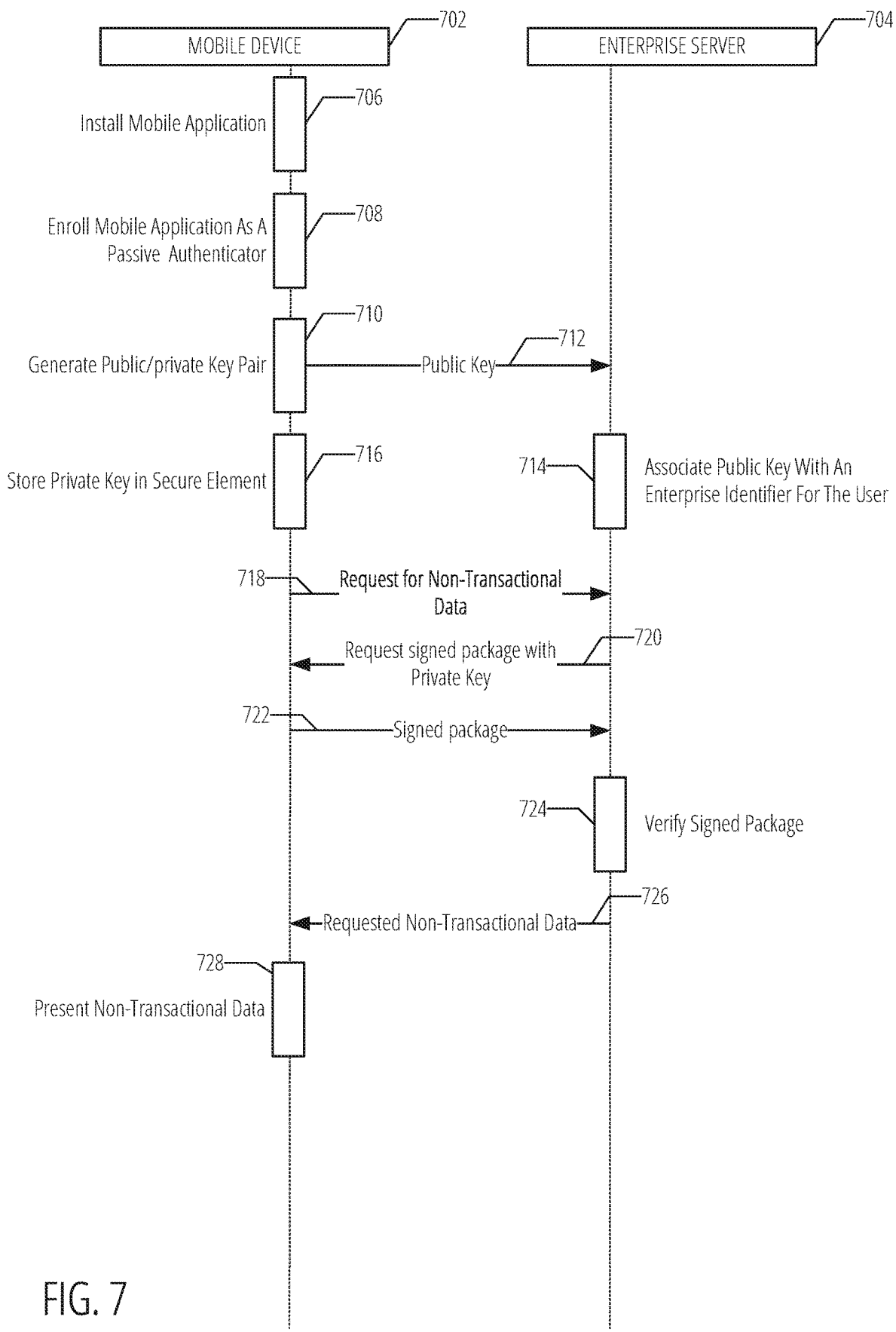
FIG. 7 is swim lane diagram illustrating a method to enroll a mobile application as a passive authenticator, in various examples.

FIG. 7 is swim lane diagram illustrating a method to enroll a mobile application as a passive authenticator, in various examples. The method is represented as a set of blocks that describe operations 706-728 of the method. The method may be embodied in a set of instructions stored in at least one computer-readable storage device of a computing device(s) such as mobile device 702 and enterprise server 704. A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 7. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 706, a user may install a mobile application on mobile device. Mobile device may be a mobile device such as mobile 102 in FIG. 1. The mobile application may be a mobile application such as mobile application 104 in FIG. 1. The mobile application may be associated with an enterprise that makes multiple installable applications. In an example, the mobile application is associated with the same enterprise (e.g., a financial institution) as enterprise server 704. Enterprise server 704 may be a set of one or more computing devices that provide services for an enterprise (e.g., a financial institution). For example, enterprise 704 may include predictive text server 118. The mobile application be associated with a mobile identification of mobile device 702 at enterprise server 704.

Accordingly, a user may have a mobile application that is a keyboard application and a primary application provided by the enterprise that provides banking functions (e.g., bill pay, transfers, etc.). The primary application may be used to enroll the mobile application as a passive authenticator at operation 708. For example, a user may log in to the enterprise using their username/password in the primary application. The primary application may present an option to enroll one or more secondary applications (e.g., the previously installed mobile application) as passive authenticators. A passive authenticator may be a mobile application that does not require the user to enter in their username/password when requesting user information (e.g., balances, etc.) from the enterprise. The passive authenticator may be associated with a user account of the user.

Once a user selects the mobile application for enrollment, a private/public key pair may be generated at operation 710. The generation may be performed by the primary application or the mobile application, in various examples. At operation 716, the private key may be stored in a secure element of mobile device 702.

At operation 712, the generated public key is transmitted to enterprise server 704. The At enterprise server 704, the public key may be stored as associated with the user (e.g., linked to the user profile). In some examples, the public key is associated with an enterprise identifier for the user at operation 714. The enterprise identifier may be an identifier that does not include any personally identifiable information. In various examples, the public key is associated with a mobile identification of mobile device 702.

Different security events may trigger deleting the private key from the secure element. For example, if a user logs out of the primary application, changes a pin code, changes a biometric authentication, etc., the private key may be deleted. A notification may also be transmitted to enterprise server 704 indicating that the mobile application is no longer a passive authenticator. A user may re-enroll the mobile application upon the user logging into the primary application again in which case a new private/public key pair may be generated.

At operation 718, a request may be made for non-transaction data (e.g., balance information) to enterprise server 704. The non-transaction data may be a user specific data value that is stored at enterprise server 704 in a user profile (e.g., user profile 120). Other types of data may also be requested that use the passive authenticator without departing from the scope of this disclosure. The request may be made from within mobile device 702. The request may include a mobile identification, a user identification, or both. Enterprise 704 may use the identification(s) to retrieve the public key for the mobile application.

At operation 720, an authentication request for a signed package with the stored private key is transmitted from enterprise 704 to mobile device 702. The request may include a one-way hash of a challenge message, the challenge message, and be encrypted using a private key of enterprise server 704 and then again with the public key associated with the mobile application as previously received at operation 712.

The mobile application may decrypt the request using the mobile application's private key, verify the digital signature using the public key of enterprise server 704, and retrieve the challenge message using the same public key. At operation 722, the mobile application may digitally sign a response package and transmit it back to enterprise server 704. Digitally signing may include encrypting the challenge message with the mobile application's private key and then encrypting the encrypted message with the public key of enterprise server 704.

At operation 724, enterprise server 704 may verify the signed package by decrypting the signed package using the private key of enterprise server 704 and decrypting the encrypted challenged message using the public key associated with the mobile application/enterprise identifier. If the decrypted challenge message matches the challenge message sent at operation 720, the mobile application is authenticated, and the requested non-transaction data is transmitted at operation 726. At operation 728 the requested non-transactional data may be presented in the mobile application.

When the non-transactional data is a user specific data value such as a balance, the data may be paired with an output term on the application. For example, the keyboard application may operate in similar manner as described in operation 612 of FIG. 6.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
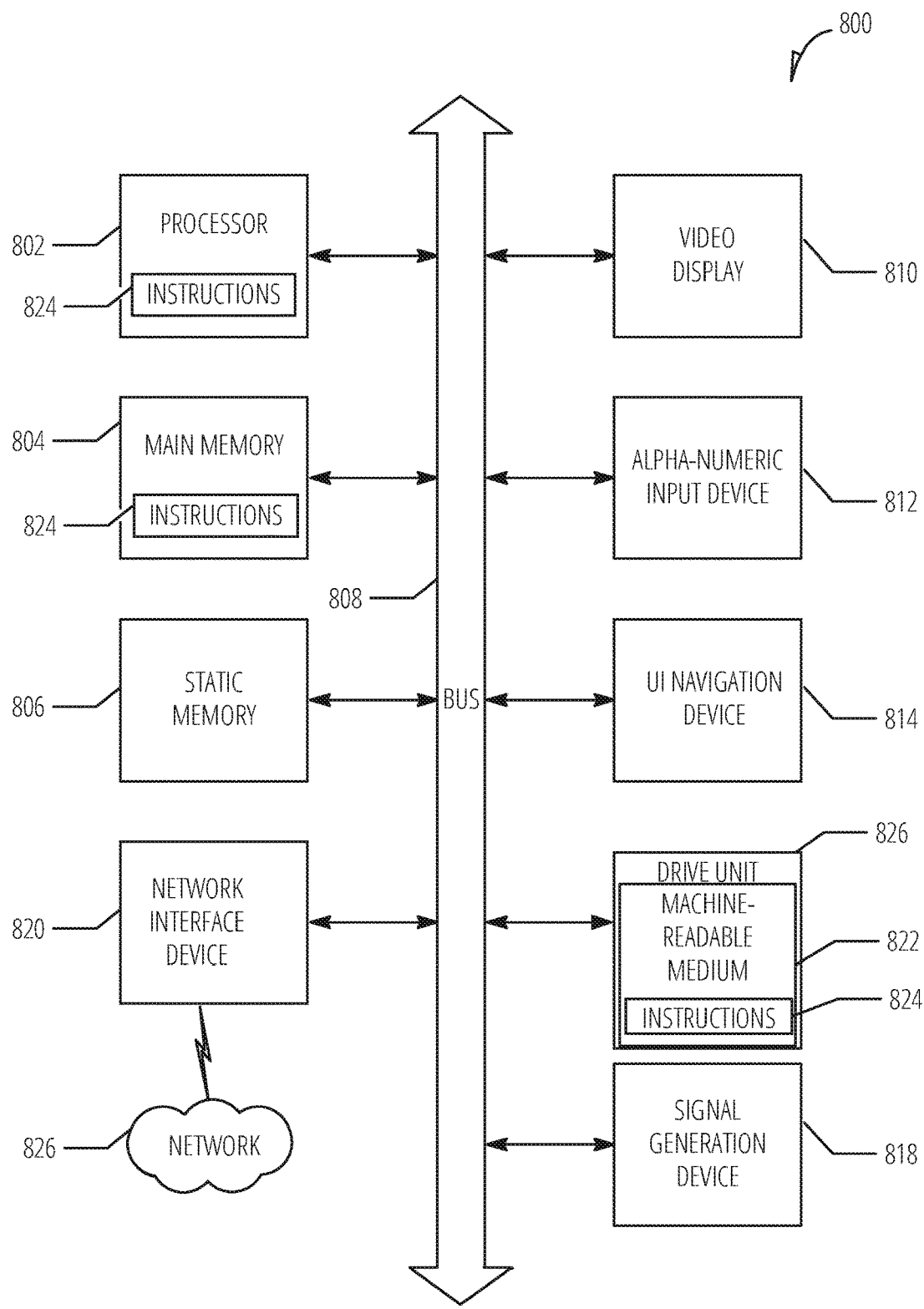
FIG. 8 is a block diagram illustrating an example machine upon which any one or more of the techniques (e.g., methodologies) discussed herein may be performed, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or 5G networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising
   presenting a user interface on a computing device, the user interface including a character input portion and a predictive suggestion portion;
   converting, using at least one processor, a set of characters entered by a user in the character input portion into a word vector;
   inputting the word vector into a neural network;
   based on the inputting, determining a set of output terms from the neural network;
   retrieving a set of account types for the user from a user profile;
   querying a data store to retrieve a user specific numerical data value, from an account type corresponding to one of the set of account types, for an output term of the set of output terms; and
   presenting a paired output term that includes the output term and the user specific numerical data value in the predictive suggestion portion of the user interface, the paired output term presented as a user interface element selectable by the user for use in the character input portion.

2. The method of claim 1, wherein the neural network is a feed forward neural network, an input layer of the neural network and an output layer of the neural network configured of a size equivalent to a number terms in a vocabulary of subject-matter specific terms in which the set of output terms are determined and wherein the neural network includes a hidden layer of neurons with no activation function.

3. The method of claim 1, further comprising, presenting simultaneously with the paired output term, a non-paired output term of the set out of output terms in the predictive suggestion portion of the user interface.

4. The method of claim 1, wherein determining the set of output terms from the neural network includes comparing a distance in vector space between the set of characters and coordinates of terms represented in the neural network.

5. The method of claim 1, further comprising:
   removing an output term from the set of output terms based on the set of account types.

6. The method of claim 5, wherein the user interface is part of an application executing on the computing device and wherein the user is authenticated before retrieving the set of account types.

7. A non-transitory computer-readable medium, comprising instructions, which when executed by at least one processor, configure the at least one processor to perform operations comprising:
presenting a user interface on a computing device, the user interface including a character input portion and a predictive suggestion portion;
converting, using at least one processor, a set of characters entered by a user in the character input portion into a word vector;
inputting the word vector into a neural network;
based on the inputting, determining a set of output terms from the neural network;
retrieving a set of account types for the user from a user profile;
querying a data store to retrieve a user specific numerical data value, from an account type corresponding to one of the set of account types, for an output term of the set of output terms; and
presenting a paired output term that includes the output term and the user specific numerical data value in the predictive suggestion portion of the user interface, the paired output term presented as a user interface element selectable by the user for use in the character input portion.

8. The computer-readable medium of claim 7, wherein the neural network is a feed forward neural network, an input layer of the neural network and an output layer of the neural network configured of a size equivalent to a number terms in a vocabulary of subject-matter specific terms in which the set of output terms are determined and wherein the neural network includes a hidden layer of neurons with no activation function.

9. The computer-readable medium of claim 7, the operations further comprising, presenting simultaneously with the paired output term, a non-paired output term of the set out of output terms in the predictive suggestion portion of the user interface.

10. The computer-readable medium of claim 7, wherein determining the set of output terms from the neural network includes comparing a distance in vector space between the set of characters and coordinates of terms represented in the neural network.

11. The computer-readable medium of claim 7, the operations further comprising:
removing an output term from the set of output terms based on the set of account types.

12. The computer-readable medium of claim 11, wherein the user interface is part of an application executing on the computing device and wherein the user is authenticated before retrieving the set of account types.

13. A system comprising:
at least one processor;
a storage device comprising instructions, which when executed by the at least one processor, configure the at least one processor to perform operations comprising:
presenting a user interface, the user interface including a character input portion and a predictive suggestion portion;
converting, using at least one processor, a set of characters entered by a user in the character input portion into a word vector;
inputting the word vector into a neural network;
based on the inputting, determining a set of output terms from the neural network;
retrieving a set of account types for the user from a user profile;
querying a data store to retrieve a user specific numerical data value, from an account type corresponding to one of the set of account types, for an output term of the set of output terms; and
presenting a paired output term that includes the output term and the user specific numerical data value in the predictive suggestion portion of the user interface, the paired output term presented as a user interface element selectable by the user for use in the character input portion.

14. The system of claim 13, wherein the neural network is a feed forward neural network, an input layer of the neural network and an output layer of the neural network configured of a size equivalent to a number terms in a vocabulary of subject-matter specific terms in which the set of output terms are determined and wherein the neural network includes a hidden layer of neurons with no activation function.

15. The system of claim 13, the operations further comprising, presenting simultaneously with the paired output term, a non-paired output term of the set out of output terms in the predictive suggestion portion of the user interface.

16. The system of claim 13, wherein determining the set of output terms from the neural network includes comparing a distance in vector space between the set of characters and coordinates of terms represented in the neural network.

17. The system of claim 13, the operations further comprising:
removing an output term from the set of output terms based on the set of account types.

18. The system of claim 17, wherein the user is authenticated before retrieving the set of account types.

* * * * *